Sept. 18, 1934.  T. J. JOHNSON  1,974,278
NET FLOAT
Filed March 19, 1934

Inventor
THEODORE J. JOHNSON

By Howard J. Whelan.
Attorney

Patented Sept. 18, 1934

1,974,278

UNITED STATES PATENT OFFICE 1,974,278

NET FLOAT

Theodore J. Johnson, Baltimore, Md.

Application March 19, 1934, Serial No. 716,236

4 Claims. (Cl. 43—50)

This invention refers to floats suitable for attachment to seine nets to support and float same in fishing waters and has among its objects to provide a float of this nature that may be made from ground cork, shavings of balsam, and other light materials that are suitable and economical; also to have the float capable of using rubber or similar flexible waterproof materials that can be molded to contain the ground cork and the like and given any form that may operate to the advantage of the functions of the float, this may include a stream-line design, form of a fish or otherwise. The purpose of the use of the flexible rubber is not only to afford a less conspicuous movement of the float in the water, but also to make it less injurious to the net or operator's hands or equipment, which the metallic and rigid forms have been found to cause. The flexibility also prevents injury to itself and increases its life. The use of rubber also provides for coloring to any degree and of a fast and lasting nature.

The invention is more fully explained by reference to the accompanying drawing showing a preferred embodiment and in which:—

Similar reference characters refer to similar parts throughout the drawing.

Figure 1:
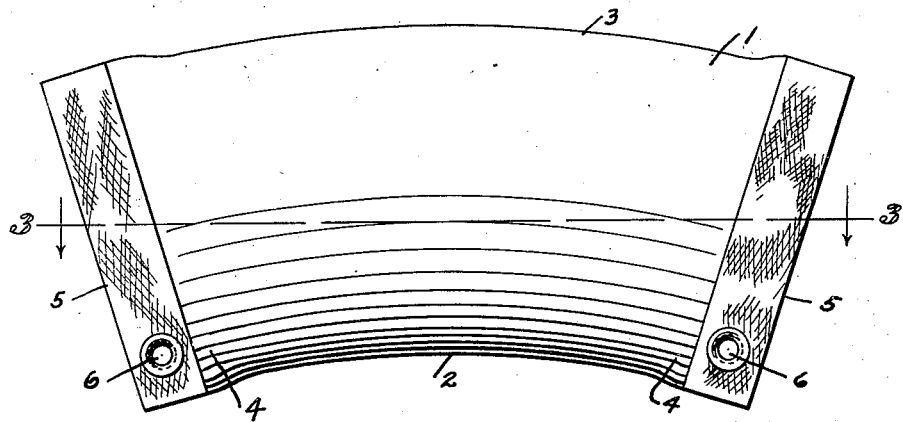
Figure 1 is a plan view of a float embodying this invention.
Figure 2:
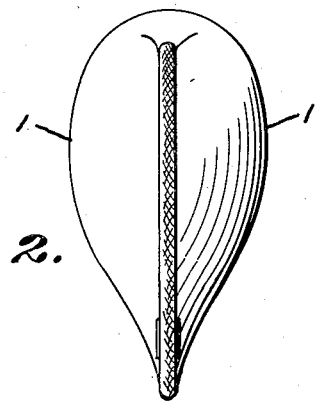
Figure 2 is a side elevation of Figure 1.
Figure 3:
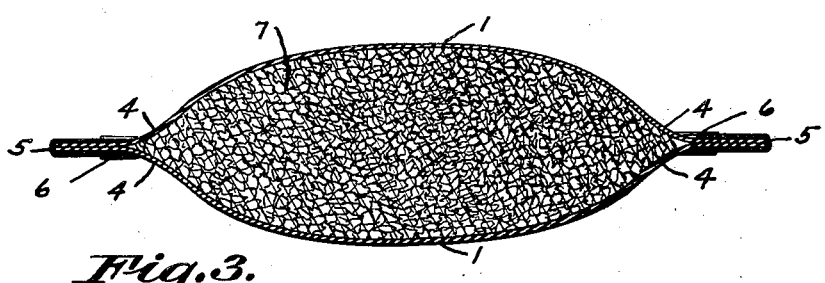
Figure 3 is a section on the line 3—3 in Figure 1.

In the construction indicated, 1 is the exterior shell of flexible rubber or similar material, formed with an arc-like front 2 and rear 3, and with its sides 4 restricted and closed, a clamping strip 5 being provided on both sides to reinforce them. Holes and grommets 6 are provided towards the front of the sides as shown, for the attachment of net wires that connect with the seine in a conventional manner.

The interior of the shell is filled with ground cork 7 and gives a rounded form to the shell, and makes it have a flexible and pliable body. All the seams can be vulcanized to keep the interior contents dry.

After the float is attached and in use, it is apt to suffer from many and varied actions from the currents in the sea, but the flexibility enables it to adapt itself and soften the blows it gives or is given. This feature renders it safer to use while not depriving it of any of its distinct advantages. The net wires also being connected at the grommets are flexibly taut by reason of the "give" in the rubber, and avoid the tearing and severe jumping action which rigid floats have. It is needless to add that the float does not change its form in use, either by having dents or twists which knocks and use give to metallic and rigid forms.

The arc-like forms gives a more flexible bending action to the float when attached to the net.

The flexibility and rubbery aspect of the float also has a less scaring action on the fish, even touching the float does not bring objectional repellant action to them, as the device when wet feels very much like the flesh of a fish, and if colored to suit cannot be hardly distinguished from it. Other floats of this nature do not have this feature and mitigate against the usefulness of their particular forms and materials.

While but one form of the invention is indicated in the drawing, it is not desired to limit this application to that particular form, otherwise than limited by the prior art, as it is appreciated that other forms and constructions could be made that would employ the same principles and come within the scope of the appended claims.

What is claimed is:

1. A float of the class described comprising a body of rubberlike material, and having a fan like form with its front and rear contours of arc-like form, floating material in said body and packed to give it a smooth extended form, a plurality of clamping strips securely attached to the closure opening of the body, and having a plurality of grommets and holes therein for attaching netwires thereto.

2. A fishing float having a rubberlike flexible body formed in a fan like bag structure with the sides acutely cut, a floating loosely packed material in the interior of the structure and packed to extend same smoothly with the front and rear portions rounded, a plurality of reinforcements mounted on the sides of the structure and homogeneously connected thereto and adapted to lock the said material in the body and keep same waterproof, and means for attaching net wires thereto and keeping the float in a predetermined position with regard to the net to which the same is attached.

3. A float for fishing nets having a fan-like bag-like body formed with an interior pocket, ground cork for the pocket and packed therein to extend the body in a rounded smooth structure with an arc-like front and rear contour with the latter shorter than the front, a plurality of reinforcing clamps for binding and restricting the sides of the body and making the pocket water-tight and secure, and means for attaching net-wires thereto.

4. A float of the class described comprising a rubber bag-like fan-shaped body with an interior pocket, ground cork inserted in said pocket and extending same sufficiently to float in water, and a pair of clamps for securely fastening the openings of the pocket and stiffening the sides of the body and providing reinforcing means for attaching net-wires thereto.

THEODORE J. JOHNSON.